United States Patent
Rochman

(10) Patent No.: US 8,744,918 B2
(45) Date of Patent: Jun. 3, 2014

(54) DEMAND AMALGAMATION FOR ONLINE AUCTIONS

(75) Inventor: Marc Rochman, North Miami Beach, FL (US)

(73) Assignee: Primolow, Inc., Hollywood, FL (US)

( * ) Notice: Subject to any disclaimer, the term of this patent is extended or adjusted under 35 U.S.C. 154(b) by 807 days.

(21) Appl. No.: 12/491,071

(22) Filed: Jun. 24, 2009

(65) Prior Publication Data

US 2010/0332295 A1 Dec. 30, 2010

(51) Int. Cl.
*G06Q 30/00* (2012.01)

(52) U.S. Cl.
USPC .......................... 705/26.1; 705/27.1; 705/37

(58) Field of Classification Search
USPC .................. 705/26, 27.35, 26.1, 27.1, 37
See application file for complete search history.

(56) References Cited

U.S. PATENT DOCUMENTS

| | | | | |
|---|---|---|---|---|
| 5,787,402 A * | 7/1998 | Potter et al. | | 705/37 |
| 2001/0039528 A1* | 11/2001 | Atkinson et al. | | 705/37 |
| 2004/0215517 A1* | 10/2004 | Chen et al. | | 705/14 |
| 2005/0015327 A1* | 1/2005 | Eshet et al. | | 705/37 |
| 2005/0154674 A1* | 7/2005 | Nicholls et al. | | 705/43 |
| 2005/0203824 A1* | 9/2005 | Freud et al. | | 705/37 |
| 2005/0216393 A1* | 9/2005 | Lutnick et al. | | 705/37 |
| 2005/0278240 A1* | 12/2005 | Delenda | | 705/37 |
| 2005/0283420 A1* | 12/2005 | Bailey et al. | | 705/37 |
| 2006/0178977 A1* | 8/2006 | Chapelle et al. | | 705/37 |
| 2007/0032286 A1* | 2/2007 | Muir | | 463/16 |
| 2007/0078716 A1* | 4/2007 | Tews | | 705/14 |
| 2007/0179879 A1* | 8/2007 | Pomeranz et al. | | 705/37 |
| 2008/0004977 A1* | 1/2008 | Fisher | | 705/26 |
| 2008/0162299 A1* | 7/2008 | Gusler et al. | | 705/26 |
| 2009/0076831 A1* | 3/2009 | Chalemin et al. | | 705/1 |
| 2011/0137740 A1* | 6/2011 | Bhattacharya et al. | | 705/17 |

* cited by examiner

*Primary Examiner* — James Zurita
(74) *Attorney, Agent, or Firm* — Steven M. Greenberg, Esq.; CRGO Law

(57) ABSTRACT

Embodiments of the present invention provide a method, system and computer program product for demand amalgamation in an online auction. In an embodiment of the invention, a computer implemented method for demand amalgamation in an online auction can be provided. The method can include, in a single online auction provided by an online auction management system executing in at least one host server, the acceptance of bids for associated different items in the online auction management system. At least two of the different items can be of a different item type. The method further can include the determination of winning bids amongst the accepted bids by way of a comparison of the accepted bids to one another without regard to whether or not the accepted bids had been placed for an item of a specific item type. Finally, for each determined one of the winning bids, one of the different items associated with the determined one of the winning bids can be awarded to a winning bidder corresponding to the determined one of the winning bids through the online auction management system.

10 Claims, 3 Drawing Sheets

DEMAND AMALGAMATION FOR ONLINE AUCTIONS

BACKGROUND OF THE INVENTION

1. Field of the Invention

The present invention relates to the field of e-commerce auctions and more particularly to the matching of offer and demand in online auctions operated in an e-commerce computing environment.

2. Description of the Related Art

E-commerce refers to the sale or marketing of goods or services over a computer communications network, for instance the global Internet. Though e-commerce has been part and parcel of computing for many decades, many believe that the development and explosive use of the World Wide Web has catapulted e-commerce as a preferred mode of product and service distribution over and above traditional brick and mortar outlets. In particular, the ubiquity of the e-commerce storefronts has shattered the geographic limitations of traditional in person marketing and sales of goods and services.

E-commerce generally implies direct business to consumer sales of products and services, as well as business to business and consumer to consumer sales of products and services. The modern e-commerce auction forms a substantial component of on-line sales of goods and services. For many, access to an auction style environment for the sale and purchase of goods and services not only enhances the market by providing an efficient price-setting mechanism for those goods and services, but also on-line shoppers find the on-line auction environment to be both productive and entertaining.

Conducting an auction in a conventional brick and mortar environment has proven to be a straightforward process for distributing and acquiring desired goods and services through an efficient price-setting mechanism. Unique to the auction over the traditional commerce setting is the one-time sale of a set of lots at a designated time and place. Accordingly, participants inherently are incentivized to participate in the auction, at least because the participants have traveled to the auction site with an event mentality and, consequently, participants generally maintain the intent to participate in the auction. On-line auctions, however, suffer from the minimal effort required for the consumer to participate in the auction and the sheer number of auctions available for participation through the World Wide Web at any given time.

The ability of the auction environment to produce the sale of efficiently priced goods and services largely depends upon the number of participants engaged in the auction. For auctions of only a few bidders, a price approaching market value seldom results. However, for auctions of many bidders, an efficient market price will result over time. Thus, as a seller, one prefers an auction of many bidders. Conducting an auction on-line, however, runs the risk of an auction that is under-attended or under-bid. To work well, auction market designs must provide thickness in that an auction market design need attract a large enough proportion of the potential participants in the market.

The traditional online auction can be characterized either as a single unit auction or a multi-unit auction. In a single unit auction, a single product or service can be auctioned to the highest bidder. By comparison, in a multi-unit auction, multiple products or services can be offered in a single auction and the products or services can be awarded to the highest bidders in quantities and at a price that follow preset allocation rules.

In a single unit auction, generating enough demand amongst potential bidders can be challenging and requires a substantial marketing effort on the part of the auctioneer. To that end, auctions can be arranged to last days or weeks in an effort to aggregate enough demand for auctioned products or services. Further, sellers can be tempted to place reserve prices on auctioned products or services to protect the sellers from lower than acceptable final pricing for auctioned products or services. Multi-unit auctions compound the problem of demand in that adequate demand must exist for every item in the multi-unit auction before the multi-unit auction can commence. However, in that on-line auctions as compared to traditional brick-and-mortar auctions can promote spontaneous participation amongst consumers, consumers generally prefer, if not require, the availability of an auction in which to participate without substantial delay. Otherwise, consumers tend to lose interest in participating in the auction process. Thus, the necessity of producing a continuous and rapid succession of multi-unit auctions competes with the necessity of generating enough demand for each multi-unit auction in order to ensure the success of the multi-unit auction.

BRIEF SUMMARY OF THE INVENTION

Embodiments of the present invention address deficiencies of the art in respect to the matching of offer and demand in online auctions and provide a novel and non-obvious method, system and computer program product for demand amalgamation in an online auction. In an embodiment of the invention, a computer implemented method for demand amalgamation in an online auction can be provided. The method can include, in a single online auction provided by an online auction management system executing in at least one host server, the acceptance of bids for associated different items in the online auction management system. At least two of the different items can be of a different item type.

The method further can include the determination of winning bids amongst the accepted bids by way of a comparison of the accepted bids to one another without regard to whether or not the accepted bids had been placed for an item of a specific item type. Finally, for each determined one of the winning bids, one of the different items associated with the determined one of the winning bids can be awarded to a winning bidder corresponding to the determined one of the winning bids through the online auction management system.

In another embodiment of the invention, an e-commerce data processing system can be provided to include a host server with a processor and a memory. An online auction management system can execute in memory by the processor in the host server. Additionally, a demand amalgamation module can be coupled to the online auction management system. The module can include program code enabled to accept bids for associated different items in the online auction management system, at least two of the different items being of a different item type. The program further can be enabled to determine winning bids amongst the accepted bids by comparing the accepted bids to one another without regard to whether or not the accepted bids had been placed for an item of a specific item type. Finally, the program code can be enabled to award for each determined one of the winning bids, one of the different items associated with the determined one of the winning bids to a winning bidder corresponding to the determined one of the winning bids through the online auction management system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for demand amalgamation in an online auction. In accordance with an embodiment of the present invention, multiple different units of a product or service of different respective product or service types can be offered for bidding to different bidders in a single online auction. Each bidder in the single online auction, however, can specify a particular one or multiple ones of the multiple different units for bidding and can become associated with the particular one or multiple ones of the multiple different units for bidding. Each of the bids received from the bidders can be compared to one another and, irrespective of the particular one of the units for which each of the bidders has bid, one or more highest bidders can be determined to be the winners of the single online auction. Thereafter, one or more winners of the single online auction can be awarded the particular one of the units for which their winning bid was placed.

Figure 1:
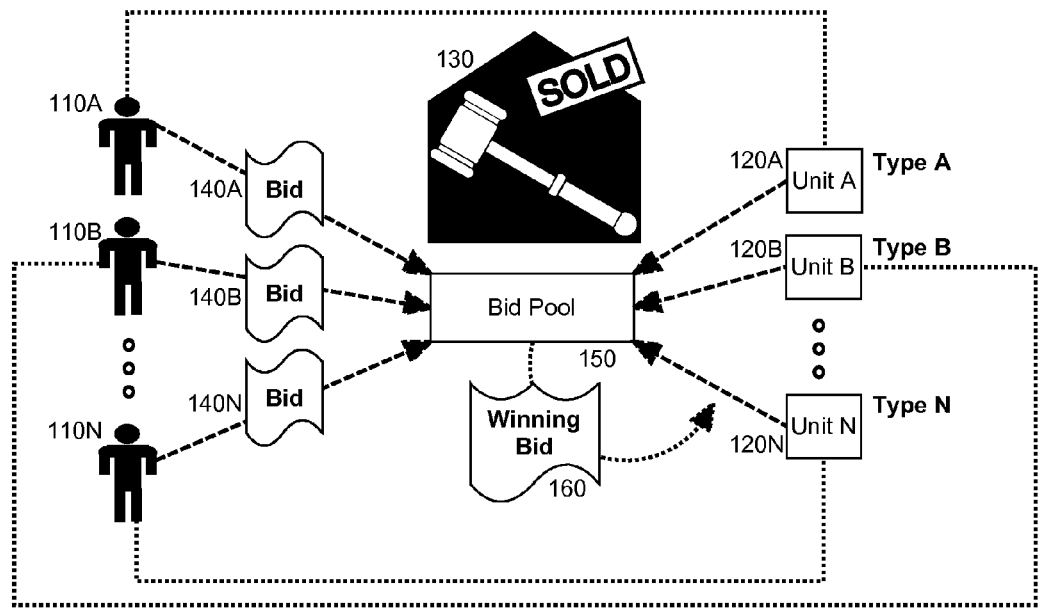
FIG. 1 is a pictorial illustration of a process for demand amalgamation in an online auction.

In illustration, FIG. 1 pictorially depicts a process for demand amalgamation in an online auction. As shown in FIG. 1, different bidders 110A, 110B, 110N can register with a single online auction 130 to bid on respective units 120A, 120B, 120N—each a product or service. Each of the different bidders 110A, 110B, 110N subsequently can access the single online auction 130 by way of a Web browser disposed in a personal computer or pervasive device such as a mobile telephone or personal digital assistant. Alternatively, the different bidders 110A, 110B, 110N can access the single online auction 130 by way of an automated voice response system (not shown) supplying telephonically specified bids through a gateway to the single online auction 130.

The units 120A, 120B, 120N can be associated with one another according to unit characteristics such as unit type (product or service type), or similar or identical value, or both, by way of example. Thereafter, the bids 140A, 140B, 140N can be pooled together in a bid pool 150 such that the bids 140A, 140B, 140N can be compared to one another irrespective of a particular one of the units 120A, 120B, 120N for which a particular one of the different bidders 110A, 110B, 110N has bid and thus to which the particular one of the different bidders 110A, 110B, 110N has become associated.

In particular, the bidders 110A, 110B, 110N can place different bids 140A, 140B, 140N for desired ones of the units 120A, 120B, 120N and the bid pool 150 can be processed to determine one or more winners amongst the bidders 110A, 110B, 110N according to one or more winning ones of the bids 140A, 140B, 140N for all of the units 120A, 120B, 120N. Thereafter, a corresponding desired one of the units 120A, 120B, 120N can be identified for the winner amongst the bidders 110A, 110B, 110N and the identified corresponding one of the units 120A, 120B, 120N can be awarded to the winner amongst the bidders 110A, 110B, 110N. In this way, demand for the different units 120A, 120B, 120N can be amalgamated into a single online auction process in the single online auction 130.

Of note, in an aspect of the invention, each of the units 120A, 120B, 120N can represent a different credit on a stored value account reflected by a stored value card, gift certificate, gift card, "e-wallet", or other such representative article for a credit on a stored value account. The units 120A, 120B, 120N can be of a different type in that each stored value account associated with each different one of the units 120A, 120B, 120N can relate to a different vendor so that the stored value account can be used to purchase goods or services from a corresponding vendor. Alternatively, the stored value account can relate to a merchant account so that the stored value account can be used across multiple different vendors configured to transact purchases through the merchant account.

To the extent that each of the units 120A, 120B, 120N represents a credit for a different stored value account, a winning bid 160 for a winning one of the bidders 110A, 110B, 110N can be applied to the stored value account corresponding to the winning one of the bidders 110A, 110B, 110N so that the value of the credit on the stored value account varies according to the winning bid 160. Further, the timing of the winning bid 160 relative to other bids of the other bidders 110A, 110B, 110N can be used to compute a reward (not shown). In this regard, the timing of the winning bid 160 can include a time when the winning bid 160 was placed by the winning bidder, the time when the winning bid 160 was received from the winning bidder, or any time in between. Consequently, in one aspect of the embodiment, the value of the credit on the stored value account can include a combination of the winning bid 160 and the reward. For example, if the winning bid 160 for a stored value account such as a gift card was $80.00US reflecting an amount desired by the bidder to be loaded onto the gift card, and if the reward for the winning bid 160 was $20.00US, the total value applied to the credit on the stored value account will be $100.00US, though the bidder placing the winning bid 160 need only pay $80.00US.

Figure 2:
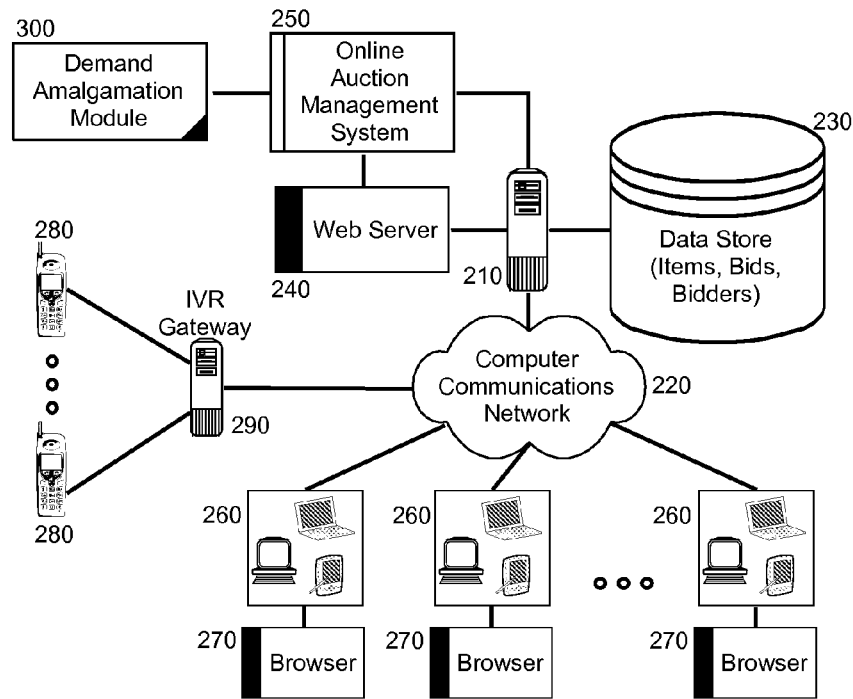
FIG. 2 is a schematic illustration of an e-commerce data processing system configured for demand amalgamation in an online auction; and, FIG. 3 is a flow chart illustrating a process for demand amalgamation in an online auction; and, FIG. 4 is a pictorial illustration of a process for demand amalgamation of stored value cards for different vendors in an online auction.

The process described in connection with FIG. 1 can be performed in connection with an e-commerce data processing system. In further illustration, FIG. 2 is a schematic illustration of an e-commerce data processing system configured for demand amalgamation in an online auction. The system can include at least one host server 210 (only a single host server shown for the purpose of illustrative simplicity), configured for communicative coupling over computer communications network 220 to one or more clients 260, such as a personal computer or pervasive computing device like a mobile phone or personal digital assistant, each supporting the execution of a content browser 270 or other client application configured to access the host server 210.

To the extent that multiple host servers are present, at least one host server can support the execution of any combination of a Web server, a corresponding database management system, an application server, a load balancing server and the like. In any event, the host server 210 preferably can include a Web server 240 serving content over the computer communications network 220 to interacting ones of the content browsers 270. In this regard, the served content can include a user interface and include data provided by an online auction management system 250 executing in the host server 210.

Specifically, the online auction management system 250 can be configured to create and manage single unit and multi-unit auctions for different goods and services for different bidders interacting with the online auction management system 250 by way of the content browsers 270 or other client applications configured to access the host server 210 over the computer communications network 220. Different units for sale, along with the identity of the different bidders and provided bids can be stored in one or more data stores 230 coupled to the host server 210. Importantly, the online auctions created and managed by the online auction management system can be configured for demand amalgamation.

In particular, a demand amalgamation module 300 can be coupled to the online auction management system 250. The demand amalgamation module 300 can include program code enabled to group together different units according to a specified profile for demand amalgamation. The specified profile can include, for example, a specific value for units to be amalgamated into a single online auction, or a specific range of values for units to be amalgamated into a single online auction. As another example, the specified profile can include a type of unit, for instance type of product like a stored value card, a consumer electronic device, a household product, etc.

The program code of the demand amalgamation module 300 further can be configured, based upon the grouping of different units, to generate a representative unit for which a single online auction can be conducted amongst bidders seeking to bid on specific ones of the different units in the grouping. The program code of the demand amalgamation module 300 yet further can be enabled to determine a winner of the single online auction (or in the case of a multi-unit auction, the winners of the single online auction) and to match the winner to a specific one of the different units in the grouping. As an option, the program code of the demand amalgamation module 300 can be enabled to prompt losing ones of the bidders to participate again in a different online auction for a representative item corresponding to the different units in the grouping. And finally, as yet another option, the program code of the demand amalgamation module 300 can be enabled to prompt one or more of the losing ones of the bidders to purchase the item upon which the corresponding losing ones of the bidders had bid.

Figure 3:
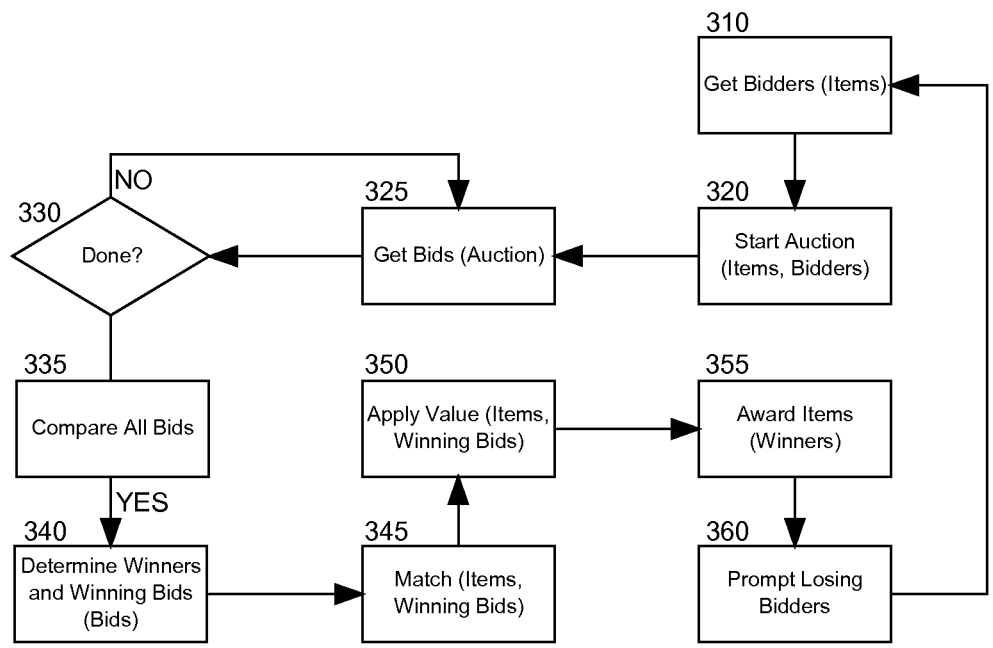

In more particular illustration of the operation of the demand amalgamation module 300, FIG. 3 is a flow chart illustrating a process for demand amalgamation in an online auction. Beginning in block 310, different bidders seeking to bid on units of different items of different item types at auction can be identified and registered to participate in a single online auction for a corresponding unit or units of the different items of different item types. In block 320, a single online auction can be initiated with respect to the bidders for the corresponding unit or units. In block 325 bids can be received from the bidders in the single online auction with respect the corresponding unit or units and pooled for common comparison. In decision block 330, if the online auction has completed, in block 335 the bids received can be compared to determine one or more winners amongst the bidders in block 340 without regard to particular units bid upon by the bidders.

In block 345, the particular item or items in the selection corresponding to the winning bidder or bidders can be determined. Optionally, where the item or items is a credit for a stored value account, in block 350 the value of each winning bid and any reward resulting from the corresponding winning bidder having placed the winning bid can be applied as the value of the credit for the stored value account. Regardless, in block 355, the item or items can be awarded to the corresponding winning bidders. Optionally, in block 360, one or more of the losing ones of the bidders can be prompted to participate in a forthcoming online auction so as to bid again on desired ones of the units of items in the selection. Alternatively or in combination, one or more of the losing ones of the bidders can be prompted to purchase the item or items for which the losing bidder had bid.

Figure 4:
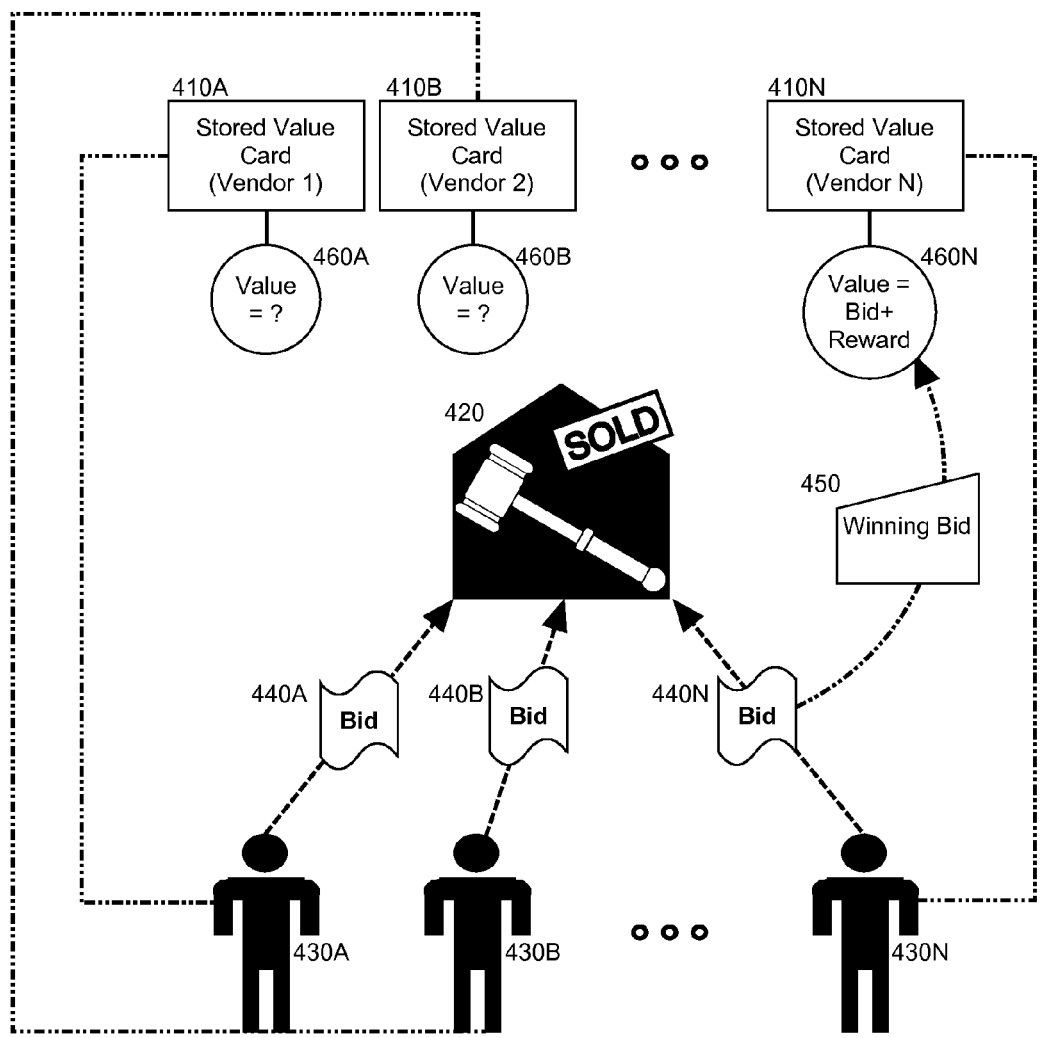

In a particular use case of the foregoing embodiments, the different items can be credits for different stored value accounts for different vendors such as those reflected by a stored value card, gift certificate, gift card, "e-wallet", or other such representative article for a credit on a stored value account. For example, with reference to FIG. 4, different stored value cards 410A, 410B, 410N can be offered for bidding in an on-line auction 420. Of note, each of the stored value cards 410A, 410B, 410N can include a corresponding value 460A, 460B, 460N not determined prior to the auction 420, and can each correspond to a different vendor. Different bidders 430A, 430B, 430N can select one or more of the different stored value cards 410A, 410B, 410N for bidding.

Once the auction 420 has commenced, bids 440A, 440B, 440N can be accepted from the different bidders 430A, 430B, 430N and a winning bid 450 (or multiple winning bids) can be determined by comparing each of the bids 440A, 440B, 440N irrespective of to which of the particular one of the stored value cards 410A, 410B, 410N the bids 440A, 440B, 440N had been directed. Each winning bid 450 can be combined with a reward associated with the conduct of the auction 420, such as a reward provided in consequence of the timing of the bids 440A, 440B, 440N, or a reward provided in consequence of the bidders 430A, 430B, 430N participating in a game of skill. Finally, for each winning bid 450, the combination of the reward and the winning bid 450 can be applied to one or more of the stored value cards 410A, 410B, 410N associated with the winning one of the bidders 430A, 430B, 430N.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A computer implemented method for demand amalgamation in an online auction, the method comprising:

in a single online auction provided by an online auction management system executing in memory by a processor of at least one host server, accepting bids for associated different items in the online auction management system, at least two of the different items being of a different item type;

determining winning bids amongst the accepted bids by comparing the accepted bids to one another without regard to whether or not the accepted bids had been placed for an item of a specific item type; and, for each determined one of the winning bids, awarding one of the different items associated with the determined one of the winning bids to a winning bidder corresponding to the determined one of the winning bids through the online auction management system.

2. The method of claim 1, wherein the different items comprise different credits on stored-value accounts, at least two of the different stored value accounts corresponding to a different vendor.

3. The method of claim 1, further comprising:

determining losing ones of the bidders; and, prompting a losing one of the bidders to either participate in a forthcoming online auction for the item upon which the losing one of the bidders had bid or purchase the item upon which the losing one of the bidders had bid.

4. The method of claim 2, further comprising:

combining a winning one of the bids for a credit on a stored value account with a reward provided in consequence of the winning one of the bids to produce a value; and, applying the value as the credit to the stored value account.

5. An e-commerce data processing system comprising:

a host server with a processor and a memory;

an online auction management system executing in memory by the processor in the host server; and, a demand amalgamation module coupled to the online auction management system, the module comprising program code enabled to accept bids for associated different items in the online auction management system, at least two of the different items being of a different item type, to determine winning bids amongst the accepted bids by comparing the accepted bids to one another without regard to whether or not the accepted bids had been placed for an item of a specific item type, and to award for each determined one of the winning bids, one of the different items associated with the determined one of the winning bids to a winning bidder corresponding to the determined one of the winning bids through the online auction management system.

6. The system of claim 5, wherein the different items comprise different credits on stored-value accounts, at least two of the different stored value accounts corresponding to a different vendor.

7. A non-transitory computer program product comprising a computer usable medium embodying computer usable program code for demand amalgamation in an online auction, the computer program product comprising:

computer usable program code for accepting bids for associated different items in an online auction, at least two of the items being of a different item type;

computer usable program code for determining winning bids amongst the accepted bids by comparing the accepted bids to one another without regard to whether or not the accepted bids had been placed for an item of a specific item type;

computer usable program code for awarding, for each determined one of the winning bids, one of the different items associated with the determined one of the winning bids to a winning bidder corresponding to the determined one of the winning bids.

8. The computer program product of claim 7, wherein the different items comprise different stored-value accounts, at least two of the different stored value accounts corresponding to a different vendor.

9. The computer program product of claim 7, further comprising:

computer usable program code for determining losing ones of the bidders; and, computer usable program code for prompting a losing one of the bidders either to participate in a forthcoming online auction for the item upon which the losing one of the bidders had bid or to purchase the item upon which the losing one of the bidders had bid.

10. The computer program product of claim 8, further comprising:

computer usable program code for combining a winning one of the bids for a credit on a stored value account with a reward provided in consequence of the winning one of the bids to produce a value; and, applying the value as the credit to the stored value account.

* * * * *